United States Patent
Umemura (10) Patent No.: US 7,234,751 B2
(45) Date of Patent: Jun. 26, 2007

(54) VEHICLE SUN VISORS AND METHODS FOR MANUFACTURING THE SAME

(75) Inventor: Naoki Umemura, Toyota (JP)

(73) Assignees: Kyowa Sangyo Co., Ltd., Toyota-shi, Aichi-ken (JP); Shinwa Seiko Co., Ltd., Toyota-shi, Aichi-ken (JP)

( * ) Notice: Subject to any disclaimer, the term of this patent is extended or adjusted under 35 U.S.C. 154(b) by 0 days.

(21) Appl. No.: 11/348,178

(22) Filed: Feb. 6, 2006

(65) Prior Publication Data

US 2006/0175860 A1 Aug. 10, 2006

(30) Foreign Application Priority Data

Feb. 7, 2005 (JP) ............................. 2005-030446

(51) Int. Cl.
*B60J 1/02* (2006.01)
(52) U.S. Cl. .................................. 296/97.12; 296/97.9
(58) Field of Classification Search ............. 296/97.12, 296/97.13, 97.9
See application file for complete search history.

(56) References Cited

U.S. PATENT DOCUMENTS 5,143,678 A 9/1992 Prillard

FOREIGN PATENT DOCUMENTS

JP 2002-301932 10/2002

*Primary Examiner*—Joseph D. Pape
(74) *Attorney, Agent, or Firm*—Conley Rose, P.C.

(57) ABSTRACT

A vehicle sun visors includes a support rod and a visor body pivotally mounted to the support rod. The support rod has a removal preventing projection that may prevent the visor body from being removed from the support rod. A pair of electrically conductive members made of metal is disposed within the support rod in order to supply electric power to an electric appliance, such as an illuminating lamp of a mirror unit, which is mounted to the visor body. The electrically conductive members are embedded within the support rod when the synthetic resin is used to mold the support rod. A reinforcing member is formed integrally with one of the electrically conductive members and is embedded within the removal preventing projection in order to reinforce the removal preventing projection.

16 Claims, 6 Drawing Sheets

VEHICLE SUN VISORS AND METHODS FOR MANUFACTURING THE SAME

This application claims priority to Japanese patent application serial number 2005-030446, the contents of which are incorporated herein by reference.

BACKGROUND OF THE INVENTION

1. Field of the Invention

The present invention relates to vehicle sun visors that have a support rod for mounting to a vehicle cabin ceiling. The vehicle sun visors also have a visor body pivotally mounted to a horizontal rod portion of the support rod so that the visor body can pivot about an axis of the horizontal rod portion. The present invention also relates to methods for manufacturing such vehicle sun visors.

2. Description of the Related Art

A known sun visor may have a removal prevention projection formed on a part of the outer circumferential surface of a horizontal rod portion of a support rod so that a sun visor body may be prevented from being removed from the horizontal rod portion.

The support rod may be made of synthetic resin and the removal prevention projection may be integrally formed with the support rod so that the removal prevention projection is made of the same synthetic resin as the support rod. However, if a large force is applied to the visor body in a removing direction away from the support rod, there is a possibility that the removal prevention projection (made of synthetic resin) may be broken, allowing for the accidental removal of the visor body.

Therefore, Japanese Laid-Open Patent Publication No. 2002-301932 has proposed to reinforce the removal prevention projection by a reinforcing member that is made of metal and is inserted into the removal prevention projection. According to this publication, in order to insert the reinforcing member into the removal prevention projection, the reinforcing member is first set into a mold for the support rod. The molten synthetic resin may then be charged into the mold so that the support rod is molded with the reinforcing member inserted into the removal prevention projection.

There has also been known a method to insert a metal pipe into a support rod along the entire length of the support rod. Such a support rod may be used in conjunction with a visor body having an electric appliance, such as a dressing mirror unit with an illumination lamp, in order to supply electric power to the electric appliance. Thus, an electric cable may extend from an external power source to the electric appliance through the metal pipe. However, inserting the metal pipe into the support rod and wiring the electric cable through the metal pipe requires many troublesome operations and may increase the overall manufacturing cost.

Therefore, U.S. Pat. No. 5,143,678 has proposed to insert the electric cable through an insert molding process in which the electric cable is inserted into the support rod prior to the molding process for molding the support rod with a synthetic resin.

The above teachings may be used for reinforcing a removal prevention projection of a support rod with a metal reinforcing member and also for supplying power to an electric appliance of a visor body via an electric cable extending through the support rod. Thus, the metal reinforcing member and the electric cable may be set into a mold for the support rod. A molten synthetic resin may then be charged into the mold. As a result, the metal reinforcing member may be inserted into the removal prevention projection and the electric cable may be inserted into the support rod along the length of the support rod.

However, it is difficult to reliably set the metal reinforcing member and the electric cable to suitable positions within the mold. In addition, it is likely that the metal reinforcing member and the electric cable may be offset from their intended set positions. This could be due to the pressure of the flow of the molten synthetic resin that is charged into the mold during the molding process.

SUMMARY OF THE INVENTION

It is accordingly an object of the present invention to teach improved techniques for facilitating the reinforcement of a removal preventing projection of a support rod and the wiring of an electric cable through the support rod.

In one aspect of the present teachings, vehicle sun visors are taught that include a support rod and a visor body. The support rod is made of synthetic resin and is adapted to be mounted to a vehicle cabin ceiling. The visor body is pivotally mounted to the support rod so that the visor body can move between a storage position, along the vehicle cabin ceiling, and a light-shielding position. A removal preventing projection extends from an outer peripheral surface of the support rod in order to prevent the visor body from being unintentionally or accidentally removed from the support rod. A pair of electrically conductive members made of metal is disposed within the support rod. The electrically conductive members may supply electric power to an electric appliance, such as an illuminating lamp of a mirror unit, which may be mounted to the visor body or at some other location in the vehicle. The electrically conductive members are embedded within the support rod when the synthetic resin forms the support rod. A reinforcing member is integrally formed with one of the electrically conductive members and is embedded within the removal preventing projection in order to reinforce the removal preventing projection.

With this arrangement, a reinforcing member formed on one of the electrically conductive members may reinforce the removal preventing projection of the support rod. In addition, the embedded electrically conductive members may provide a path for supplying electric power from the power source, such as a vehicle battery, to the electric appliance.

In particular, because the reinforcing member is integrally formed with one of the electrically conductive members, the number of parts constituting the vehicle sun visor may be reduced in comparison with an arrangement in which the reinforcing member is formed separately from the electrically conductive members. In such a comparison arrangement, the reinforcing member and the electrically conductive members are required to be separately inserted into the support rod. Therefore, the number of steps required for positioning an integrally formed electrically conductive member and the reinforcing member may be reduced. As a result, the manufacturing cost can be reduced.

In one embodiment, the vehicle sun visor further includes a pair of connecting terminals for connecting to a power source, a pair of contacts, and a pair of contact terminals for completing an electric circuit. Each connecting terminal is formed on one end of each electrically conductive member and extends outward from one end of the support rod by a predetermined distance. Each contact is formed on the other end of each electrically conductive member and is exposed at the other end of the support rod. The contact terminals are mounted to the visor body. The contact terminals may complete an electric circuit that includes the electric appliance. When the visor body is in a storage position, the contacts do not abut or communicate with the contact terminals. Consequently, electric power is not supplied to the electric appliance. On the other hand, when the visor body is in the storage position, the contacts abut the respective contact terminals so that the electric power can be supplied to the electric appliance.

With this arrangement, the contacts of the conducting terminals and the contact terminals of the visor body may constitute an ON/OFF switch that is turned on and off in response to the position of the visor body. Therefore, it is not necessary to provide a separate dedicated ON/OFF switch in the electric circuit of the electric appliance. In addition, the electric appliance will be turned off automatically without operator failure or oversight when the visor body has been moved to the storage position.

In another aspect of the present teachings, methods of manufacturing vehicle sun visors are taught. The methods may include the steps of preparing a mold for the molding of the support rod; positioning the pair of electrically conductive members within a cavity of the mold while spacing each of the pair of electrically conductive members apart from one another by a predetermined distance; charging or injecting a molten synthetic resin into the mold so that the support rod is integrally formed with the pair of electrically conductive members while the reinforcing member of one of the pair of electrically conductive members is positioned in the removal preventing projection; and assembling the support rod with the visor body.

With this method, a support rod, having the pair of electrically conductive members and the reinforcing members embedded within the removal preventing projection, can be formed by simply inserting the pair of electrically conductive members into the mold before the support rod is molded. Therefore, the steps for manufacturing the support rod can be reduced. As a result, the manufacturing cost the of vehicle sun visor can be reduced.

In one embodiment, the methods may further include the step of positioning a plurality of spacers between each of the pair of electrically conductive members when each of the pair of electrically conductive members is positioned within the mold. In addition, the methods may include the step of positioning a plurality of holding pins within the cavity of the mold. As a result, each of the pair of electrically conductive members may be pressed against the plurality of spacers by the plurality of holding pins.

With this embodiment, the electrically conductive members may be reliably fixed in position within the mold cavity. Additionally, the reinforcing member can be reliably positioned and embedded within the removal preventing projection to be molded with the support rod.

DETAILED DESCRIPTION OF THE INVENTION

Each of the additional features and teachings disclosed above and below may be utilized separately or in conjunction with other features and teachings to provide improved vehicle sun visors and methods of manufacturing such sun visors. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
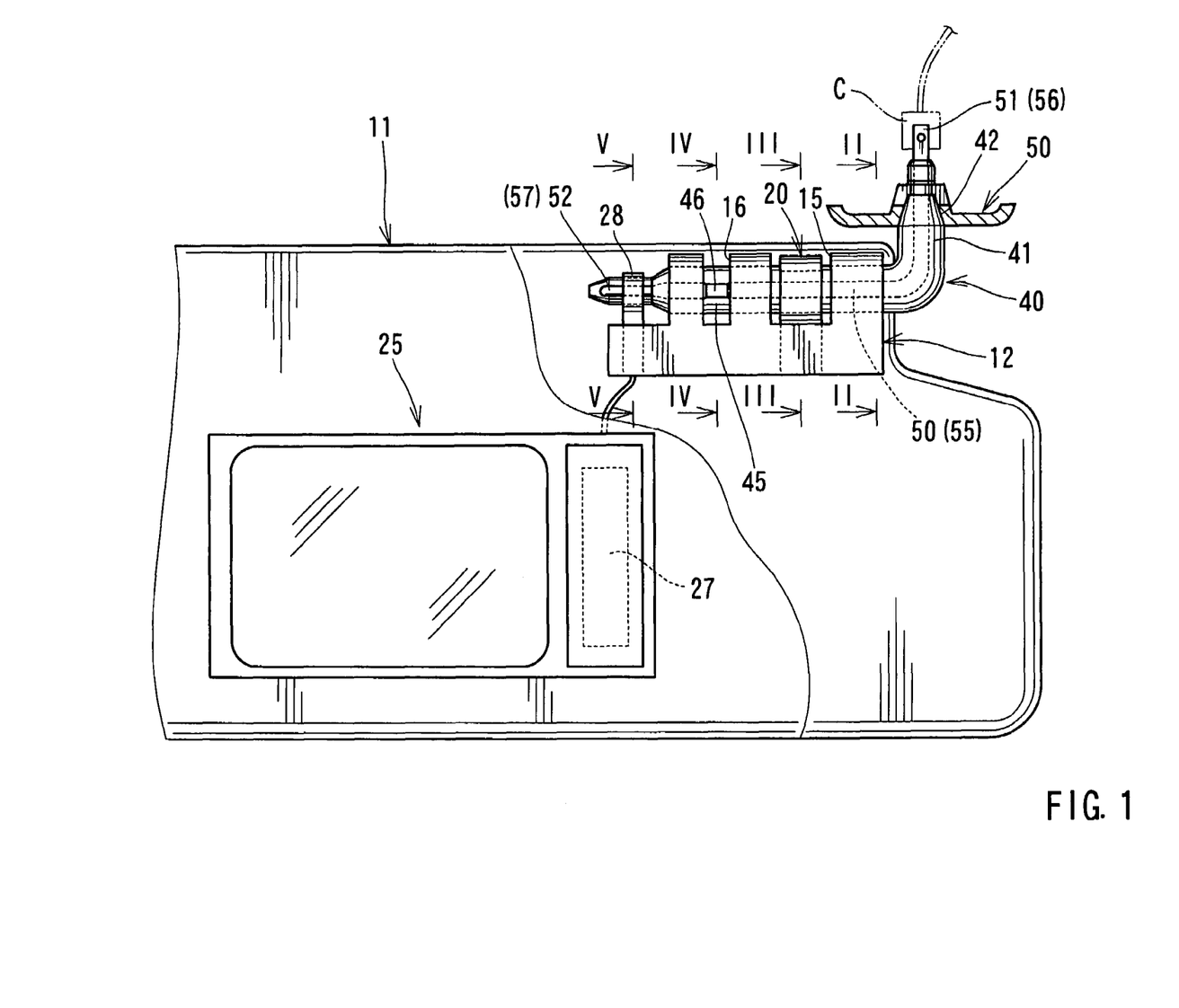
FIG. 1 is a partial front view with a partial cross-sectional area, showing the support rod and associated parts of a representative vehicle sun visor.
Figure 2:
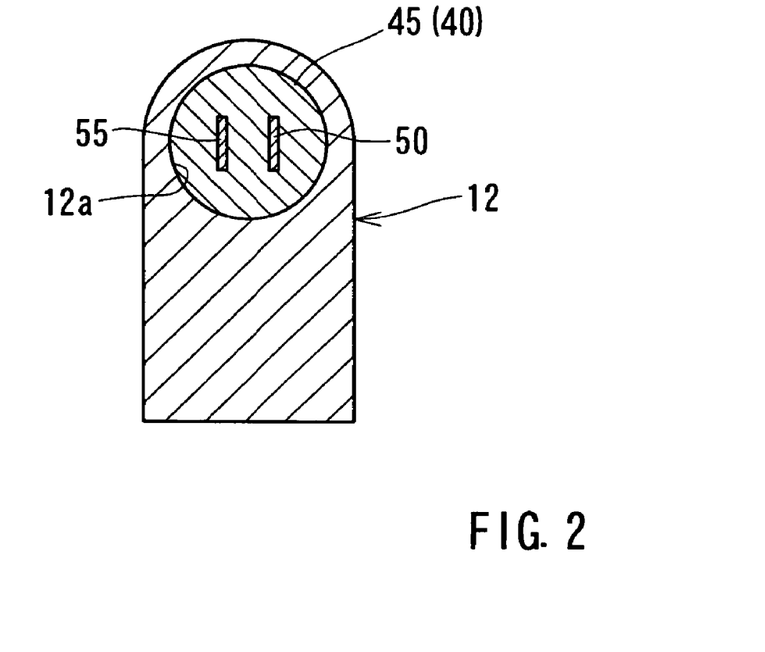
FIG. 2 is a cross-sectional view taken along line II-II in FIG. 1 and showing the relationship between a horizontal rod portion of a support rod and a bearing.

A representative embodiment will now be described with reference to FIGS. 1 to 9. Referring to FIG. 1, a representative vehicle sun visor generally includes a visor body 11 and a support rod 40. A dressing mirror unit 25 may be mounted on one side of the visor body 11 and may include an illumination lamp 27 as an electric appliance. A bearing 12 is fixedly disposed within the visor body 11 at a position proximate to an upper right corner (as viewed in FIG. 1) of the visor body 11.

As shown in FIGS. 1 to 4, the bearing 12 has a horizontal bore 12a that rotatably receives a horizontal rod portion 45 of the support rod 40. The bearing 12 also has a first cutout portion 15 for fitting a clip 20 therein and a second cutout portion 16 for engaging a removal preventing projection 46 formed on the horizontal rod portion 45 of the support rod 40.

Figure 5:
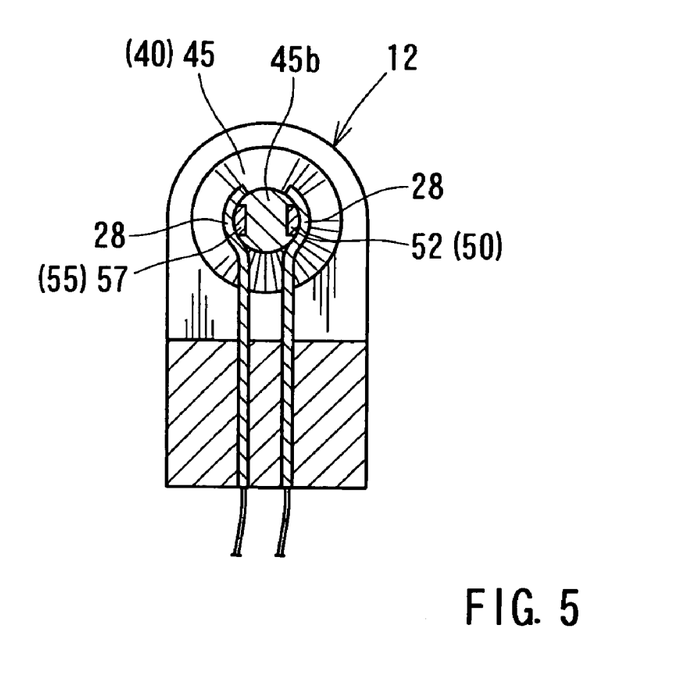
FIG. 5 is a cross-sectional view taken along line V-V in FIG. 1 and showing the relationship between the contacts of the electrically conductive members and the contact terminals of the bearing.

As shown in FIGS. 1 and 5, the bearing 12 has a pair of contact terminals 28 that are electrically connected to the illumination lamp 27 of the dressing mirror unit 25.

Figure 3:
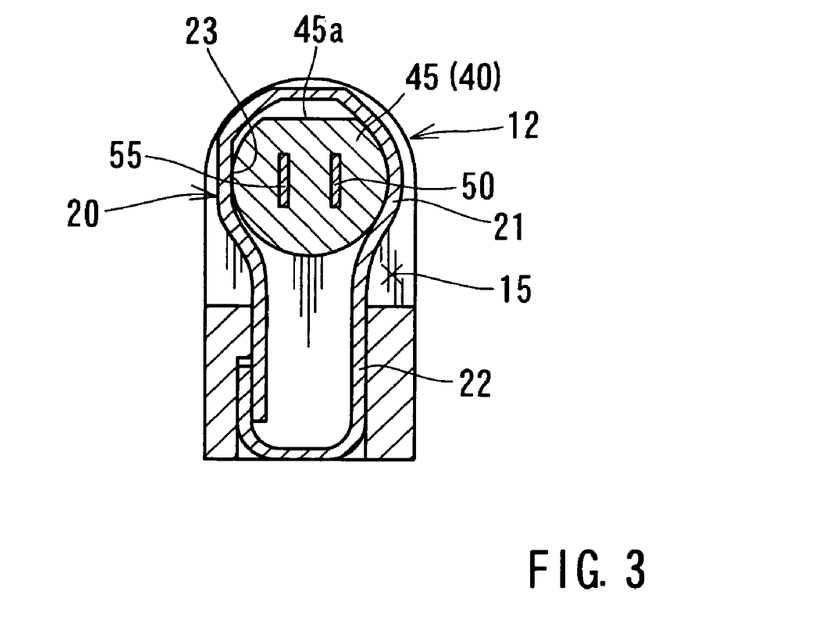
FIG. 3 is a cross-sectional view taken along line III-III in FIG. 1 and showing the relationship between the horizontal rod portion and a clip of the bearing.

As shown in FIGS. 1 and 3, the clip 20 has a resilient contact portion 21 and a pair of leg portions 22. The resilient contact portion 21 has a substantially inverted U-shaped tubular configuration and has opposite sides from which the leg portions 22 extend downward, as viewed in FIG. 3. The clip 20 may be formed by a plate spring that is bent to configure the resilient contact portion 21 and the leg portions 22. Therefore, the resilient contact portion 21 can resiliently enlarge to increase the distance between opposite lateral sides. The clip 20 may be mounted to the bearing member 12 by inserting the leg portions 22 into a corresponding engaging recess formed in the bottom of the first cutout portion 15 of the bearing member 12.

The resilient contact portion 21 may receive the horizontal rod portion 45 of the support rod 40 such that the horizontal rod portion 45 can rotate relative to and within the resilient contact portion 21. This relative rotation occurs while the opposite lateral sides of the resilient contact portion 21 are pressed against the outer circumferential surface of the horizontal rod portion 45. Therefore, the resilient contact portion 21 applies an appropriate resistance against the relative rotation of the horizontal rod portion 45 during the rotational operation of the clip 20. In addition, the resilient contact portion 21 is flattened at a portion 23, which serves as an engaging portion for engaging with a flattened engaging surface 45a formed on the horizontal rod portion 45. Portion 23 engages with flattened engaging surface 45a in order to temporarily hold the visor body 11 in a storage position where the visor body 11 extends along a vehicle cabin ceiling (not shown).

As shown in FIG. 1, the support rod 40 may pivotally support the visor body 11 via the bearing 12. The support rod 40 may be made of synthetic resin and may include a vertical rod portion 41 in addition to the horizontal rod portion 45. The support rod 40 may have a substantially L-shaped configuration. A bracket 50 may be mounted to the vehicle cabin ceiling and may have a boss portion that rotatably receives a tapered rod end 42 formed on the upper end of the vertical rod portion 41. As described above, the horizontal rod portion 45 is inserted into the bearing portion 12 and also into the resilient contact portion 21 of the clip 20. The visor body 11 can be pivoted about the horizontal rod portion 45 between a storage position located along the vehicle cabin ceiling (not shown) and a light-shielding position along a front windshield or a side window of a vehicle (not shown).

Figure 4:
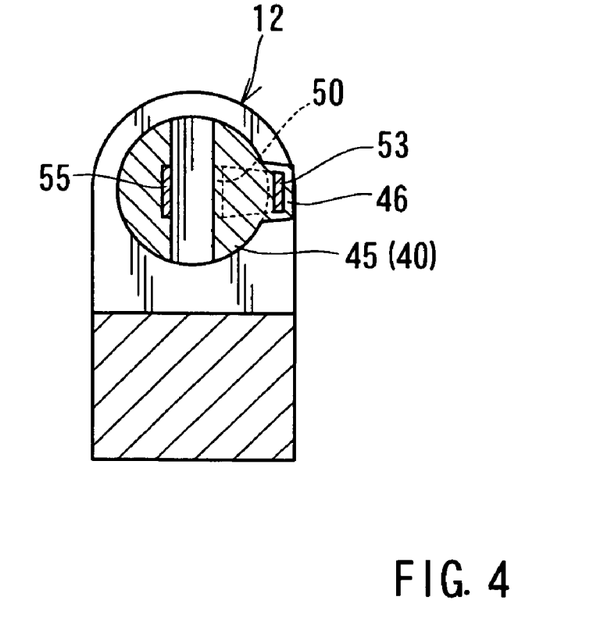
FIG. 4 is a cross-sectional view taken along line IV-IV in FIG. 1 and showing the relationship between the bearing and a removal preventing projection of the horizontal rod portion.

As shown in FIGS. 1 and 4, the removal preventing projection 46 is formed on a part of the outer circumferential surface of the horizontal rod portion 45 of the support rod 40. The removal preventing projection 46 may engage the second cutout portion 16 formed in the bearing 12, i.e., a part of the visor body 11, so that the visor body 11 may be prevented from being removed from the horizontal rod portion 45.

Figure 6:
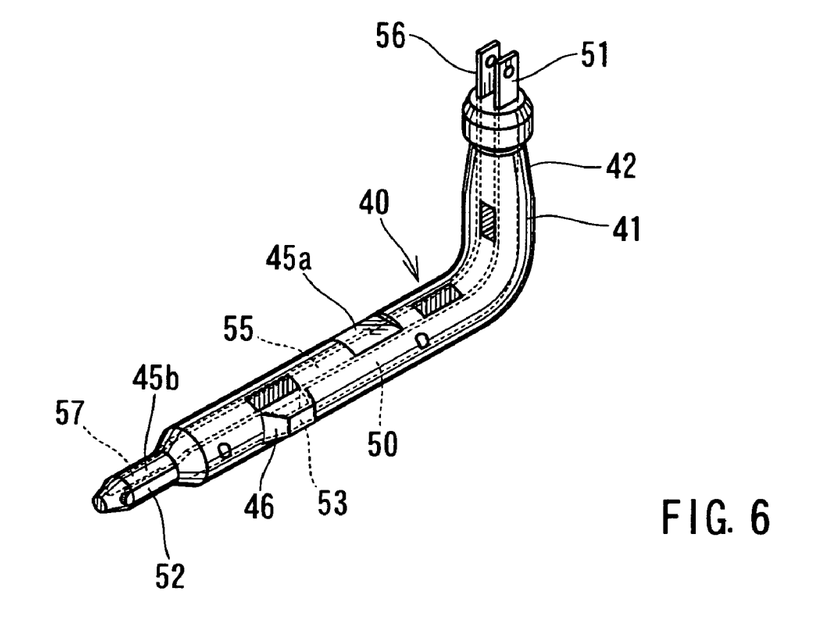
FIG. 6 is a perspective view of the support rod.
Figure 7:
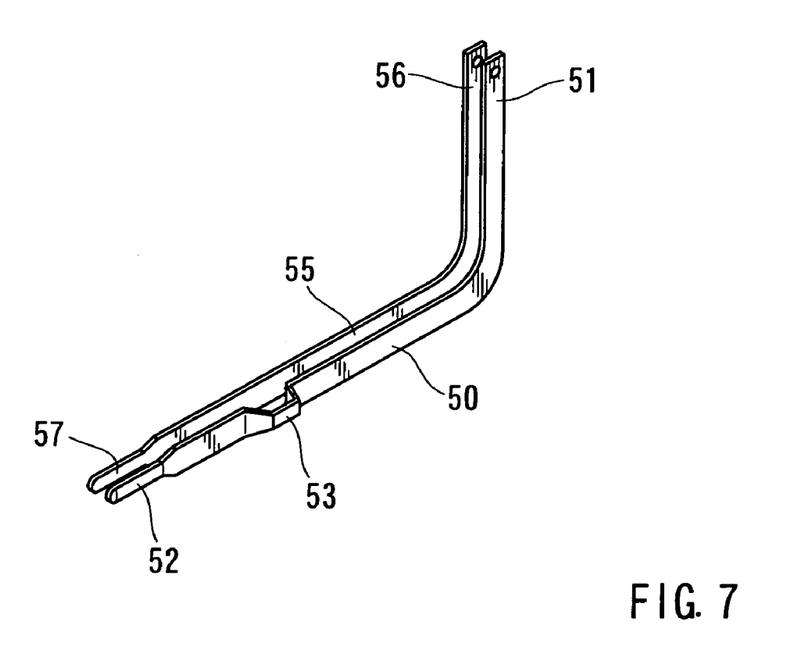
FIG. 7 is a perspective view of the electrically conductive members.

A pair of electrically conductive members 50 and 55 is made of metal and is inserted into the support rod 40 by an insert molding process, i.e. a molding process for the support rod 40 wherein the electrically conductive members 50 and 55 have been previously inserted into the mold for the support rod 40. The electrically conductive members 50 and 55 may serve as a part of an electrically conductive path for supplying power to the illumination lamp 27 of the dressing mirror unit 25. As shown in FIGS. 6 and 7, the electrically conductive member 50 has a reinforcing member 53 integrally formed with the electrically conductive member 50 and extending laterally there from. Thus, a part of the electrically conductive member 50 is bent to project in a shape similar to a U-shape in order to form the reinforcing member 53. As shown in FIG. 4, the reinforcing member 53 may extend into the removal preventing projection 46 in order to reinforce the removal preventing projection 46.

The electrically conductive members 50 and 55 have respective first end portions configured as connecting terminals 51 and 56. The connecting terminals 51 and 56 extend outward by a predetermined distance from the end portion of the vertical shaft portion 41 of the support rod 40. As shown with double dash lines in FIG. 1, a connector C, at one end of an electric cable attached to a power source such as a battery mounted in the vehicle, may be connected to the connecting terminals 51 and 56. For example, the electric cable attached to the battery may have a positive-side cable connected to the battery and a negative-side cable connected to the ground.

As shown in FIGS. 6 and 7, second end portions of the electrically conductive members 50 and 55, opposite to the first end portions, may extend outward from the horizontal shaft portion 45 at a position proximate to the small-diameter end portion 45b of the horizontal shaft portion 45. The second end portions may be configured as contacts 52 and 57 extending along diametrically opposing sides of the end portion 45b. The contacts 52 and 57 may either abut or not abut the respective connecting terminals 28, as shown in FIG. 5, in response to the pivotal orientation of the visor body 11, i.e., the rotational position of the bearing 12 relative to the horizontal rod portion 45.

Thus, the contacts 52 and 57 may not abut the respective connecting terminals 28 when the visor body 11 is in a storage position. Therefore, electric power may not be supplied to the illumination lamp 27. When the visor body 11 has been pivoted to a light-shielding position, the contacts 52 and 57 may abut the respective connecting terminals 28. Consequently, electric power may be supplied to actuate the illumination lamp 27.

As described above, the support rod 40 is made of synthetic resin according to the representative embodiment. A pair of electrically conductive members 50 and 55 are disposed or embedded within the support rod 40. In addition, the reinforcing member 53 is integrally formed with the electrically conductive member 50, of one of the pair of electrically conductive members 50 and 55, by bending a section of the electrically conductive member 50 in order to reinforce the removal preventing projection 46.

With this arrangement, the electrically conductive member 50 may have a function of reinforcing the removal preventing projection 46. This is in addition to the function of providing a pathway for supplying electric power to an electric appliance, e.g., the illumination lamp 27.

In particular, the number of parts and the steps necessary for positioning and setting the electrically conductive members 50 and 55 into a mold can be reduced because the reinforcing member 53 is integrally formed with the electrically conductive member 50. This is in comparison to a case in which the electrically conductive members and a reinforcing member are formed separately from each other and are then positioned and set into a mold. Therefore, the manufacturing cost of the representative embodiment can be reduced.

In addition, according to the representative embodiment the contacts 52 and 57 of the electrically conductive members 50 and 55 may constitute an ON/OFF switch in conjunction with the contact terminals 28 of the visor body 11. Therefore, no dedicated ON/OFF switch is required to be provided in an electrical circuit for the illumination lamp 27 of the mirror unit 25. Further, it is possible to eliminate the inadvertent operator error of not turning off a lamp switch when the visor body 11 is placed back in a storage position.

A representative method for manufacturing the support rod 40 of the representative sun visor will now be described.

First, the metal electrically conductive members 50 and 55 are prepared as shown in FIG. 7. As described above, the reinforcing member 53, which may be inserted into the removal preventing projection 46 for reinforcing the same, is integrally formed in the electrically conductive member 50 by bending a section of the electrically conductive member 50.

Figure 8:
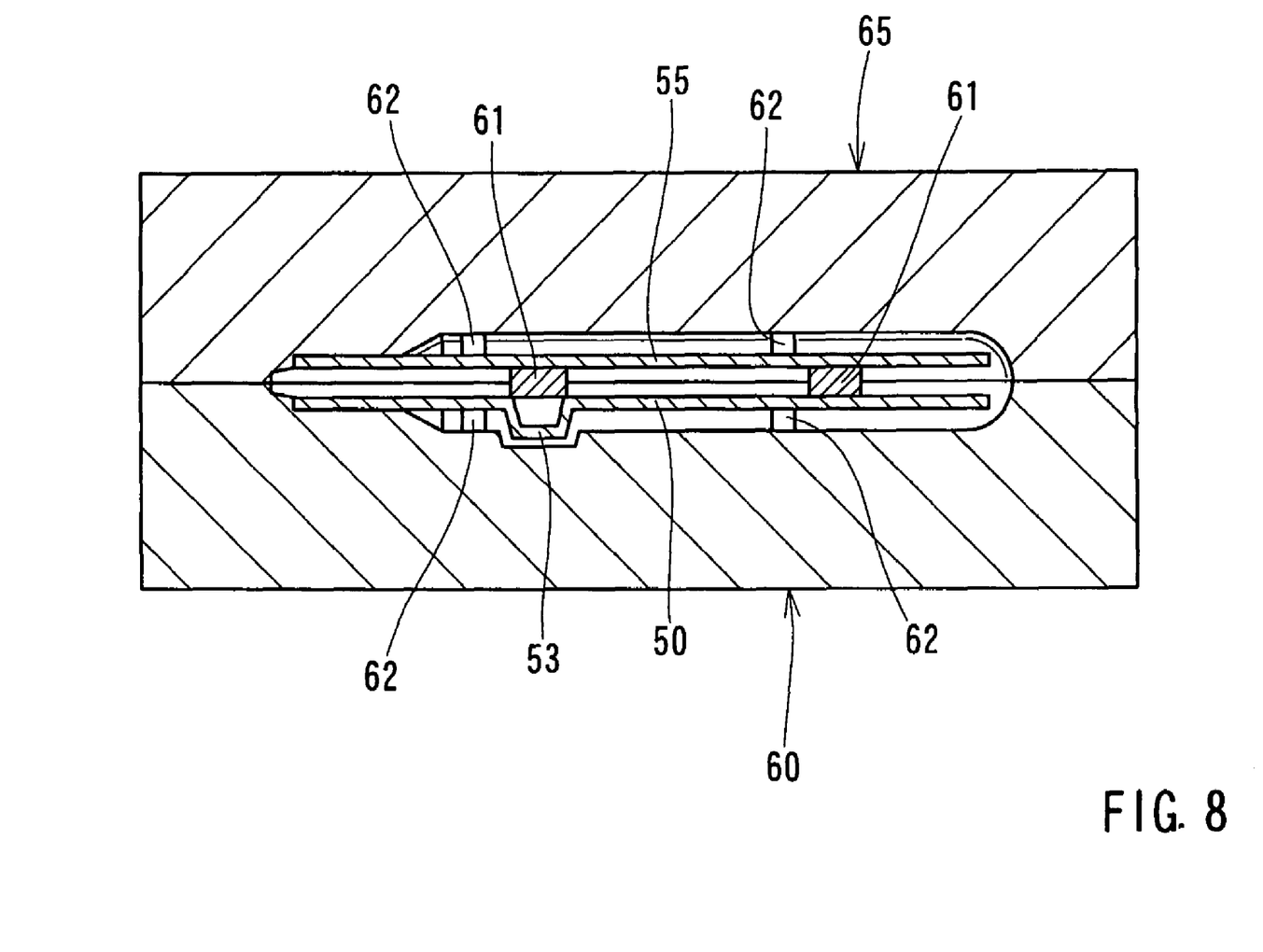
FIG. 8 is a vertical cross-sectional view of a mold for molding the support rod and showing the results of the step of positioning the electrically conductive members within a cavity of the mold according to a representative method.
Figure 9:
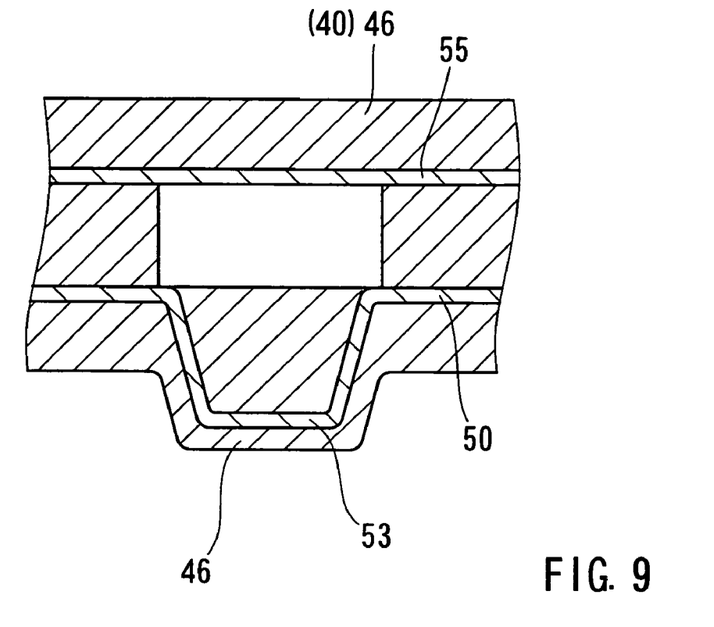
FIG. 9 is an enlarged sectional view of a part of the support rod and showing the relationship between the reinforcing member and the removal preventing projection.

Second, a mold is prepared having a pair of mold halves 60 and 65, as shown in FIG. 8. With the mold opened, the electrically conductive members 50 and 55 are then positioned and set within one of the pair of mold halves 60 and 65 (the mold half 60 in this representative embodiment). Thereafter, the mold is closed as shown in FIG. 8.

Also as shown in FIG. 8, the mold half 60 may have a plurality of spacers 61 (two spacers 61 are shown in this figure). The spacers 61 can move into and withdraw from the mold cavity so that the electrically conductive members 50 and 55 may be held spaced apart from each other at a suitable distance. In addition, a plurality of holding pins 62 may be placed on or mounted to the inner walls of the mold halves 60 and 65, in which the inner walls define the mold cavity. The holding pins 62 of the mold half 60 and the holding pins 62 of the mold half 65 are positioned so as to be opposed to each other, so that the electrically conductive members 50 and 55 are pressed against the spacers 61 by the holding pins 62.

With this arrangement, the electrically conductive members 50 and 55 may be reliably held in position within the cavity defined between the mold halves 60 and 65 when the mold has been closed.

Thereafter, molten synthetic resin may be injected into the mold so that the support rod 40, having the removal preventing projection 46 with the reinforcing member 53 projecting therein, can be integrally molded. At the same time, the electrically conductive members 50 and 55 may be embedded within the molded support rod 40 substantially along the entire length of the support rod 40, while the electrically conductive members 50 and 55 are suitably spaced apart from each other.

After the injected molten resin has solidified, the spacers 61 may be withdrawn from the cavity and the molded support rod 40. Thereafter, the mold is opened and the molded support rod 40 may be removed from the mold. In this way, the molding process of the support rod 40 may be completed.

With the above representative method, the number of steps for positioning and setting the parts may be reduced. Therefore, the manufacturing cost may be further reduced. In addition, because the holding pins 62 reliably hold the electrically conductive members 50 and 55 in position against the spacers 61, it is possible to prevent the accidental displacement of the electrically conductive members 50 and 55 as well as the reinforcing member 53 from their set positions.

As a result, the electrically conductive members 50 and 55 may be suitably disposed or embedded within the support rod 40 and the reinforcing member 53 may be reliably positioned in order to reinforce the removal preventing projection 46.

OTHER POSSIBLE EMBODIMENTS

Figure 10:
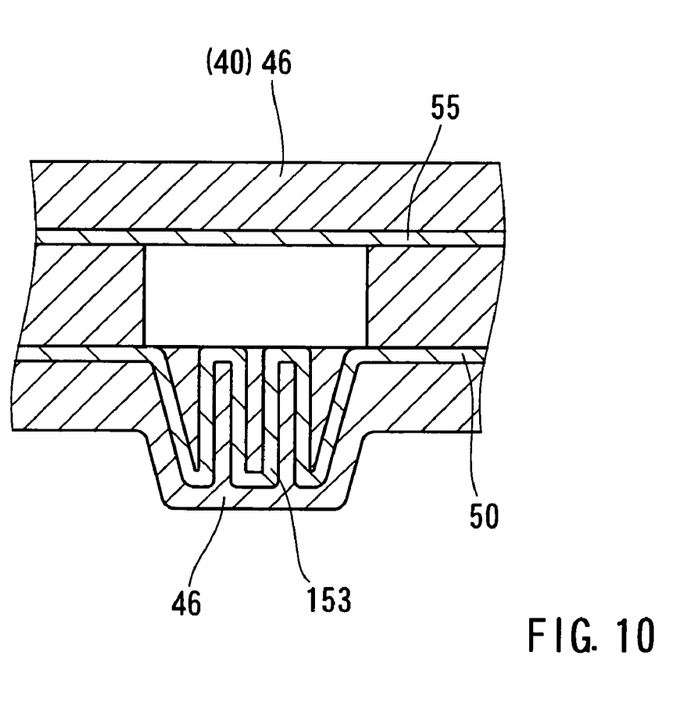
FIG. 10 is an enlarged view similar to FIG. 9 but showing an alternative configuration of the reinforcing member.

The prevent invention may not be limited to the above embodiments. For example, although the reinforcing member 53 may be formed by bending a section of the electrically conductive member 50 to project similar to a U-shape, a section of the electrically conductive member 50 may be bent in a zigzag manner to project from the electrically conductive member 50, so that a reinforcing member 153 may be formed as shown in FIG. 10. With the reinforcing member 153 bent in a zigzag manner, the reinforcement of the removal preventing projection 46 may be further improved.

This invention claims:

1. A vehicle sun visor movable between a storage position along a vehicle cabin ceiling and a light-shielding position away from the vehicle cabin ceiling, in which the vehicle sun visor comprises:
   a support rod made of synthetic resin and arranged and constructed to be mounted to the vehicle cabin ceiling;
   a visor body pivotally mounted to the support rod;
   a removal preventing projection extending from an outer peripheral surface of the support rod and pivotally securing the visor body to the support rod;
   a pair of electrically conductive members made of metal and disposed within the support rod,
   wherein the pair of electrically conductive members are arranged and configured to conduct electric power to an electric appliance mounted to the visor body; and
   a reinforcing member integrally formed with one of the electrically conductive members and reinforcing the removal preventing projection.

2. The vehicle sun visor as in claim 1, wherein each of the pair of electrically conductive members further comprises:
   a connecting terminal formed on a first end of a corresponding electrically conductive member and arranged and constructed to be connected to a power source;
   a contact formed on a second end of the corresponding electrically conductive member;
   wherein the vehicle sun visor further comprises:
      a contact terminal corresponding to each of the contacts and mounted to the visor body;
   wherein when the visor body is in the light-shielding position, each of the contacts of the pair of electrically conductive members abuts the corresponding contact terminal and completes an electric circuit defined by the respective connecting terminals of the pair of electrically conductive members; and
   wherein when the visor body is in the storage position, each of the contacts of the pair of electrically conductive members is isolated from the corresponding contact terminal and does not complete the electric circuit defined by the respective connecting terminals of the pair of electrically conductive members.

3. The vehicle sun visor as in claim 2, wherein the electric appliance is a lamp mounted to the sun visor body and the lamp is electrically connected to each of the corresponding contact terminals.

4. The vehicle sun visor as in claim 3,
   wherein the reinforcing member is formed by bending a section of at least one of the pair of electrically conductive members.

5. The vehicle sun visor as in claim 4,
   wherein the reinforcing member is bent approximately into the shape of a letter U.

6. The vehicle sun visor as in claim 4,
   wherein the reinforcing member is bent approximately into a zigzag shape.

7. A vehicle sun visor comprising:
   a support rod;
   a visor body pivotally mounted to the support rod,
   a removal preventing projection formed on the support rod to pivotally secure the visor body to the support rod;

a first electrically conductive member and a second electrically conductive member disposed within the visor rod and arranged and configured to conduct electricity;

a reinforcing member formed integrally with at least one of the first electrically conductive member or the second electrically conductive member and arranged and constructed to reinforce the removal preventing projection.

8. The vehicle sun visor as in claim 7, wherein the support rod is integrally molded with the first electrically conductive member and the second electrically conductive member.

9. The vehicle sun visor as in claim 7, wherein the support rod is made of synthetic resin; and wherein the first electrically conductive member and the second electrically conductive member are made of metal.

10. The vehicle sun visor as in claim 7, further comprising:

an electric appliance mounted to the visor body;

a pair of contact terminals mounted to the visor body and electrically connected to the electric appliance;

wherein the first electrically conductive member further comprises:

a first connecting terminal for connecting with a power source, and a first contact;

wherein the second electrically conductive member further comprises:

a second connecting terminal for connecting with the power source; and a second contact;

wherein the first contact and the second contact along with the pair of contact terminals either complete an electric circuit with the electric appliance or break the electric circuit with the electric appliance corresponding to a pivotal position of the visor body relative to the support rod.

11. The vehicle sun visor as in claim 10, further comprising:

a bearing mounted to the visor body and pivotally connecting the visor body to the support rod; and wherein the pair of contact terminals are mounted to the bearing.

12. The vehicle sun visor as in claim 10, wherein the electric appliance comprises an illumination lamp for a mirror unit mounted to the visor body.

13. The vehicle sun visor as in claim 10, wherein the support rod comprises a rod portion defining a pivotal axis of the visor body; and wherein the first contact and the second contact are disposed on opposing sides of the rod portion; and wherein the pair of contact terminals is resiliently abuts the rod portion from the opposing sides of the rod portion.

14. The vehicle sun visor as in claim 9, wherein the reinforcing member is formed by bending a section of at least one of the first electrically conductive member or the second electrically conductive member.

15. The vehicle sun visor as in claim 14, wherein the reinforcing member is bent approximately into the shape of a letter U.

16. The vehicle sun visor as in claim 14, wherein the reinforcing member is bent approximately into a zigzag shape.

* * * * *